United States Patent
Wang

(10) Patent No.: US 11,877,031 B2
(45) Date of Patent: Jan. 16, 2024

(54) AUDIO MIXING AND SIGNAL TRANSMISSION METHOD FOR NETWORK STREAMING

(71) Applicant: AVerMedia Technologies, Inc., New Taipei (TW)

(72) Inventor: Fu-Ping Wang, New Taipei (TW)

(73) Assignee: AVERMEDIA TECHNOLOGIES, INC., New Taipei (TW)

( * ) Notice: Subject to any disclaimer, the term of this patent is extended or adjusted under 35 U.S.C. 154(b) by 0 days.

(21) Appl. No.: 17/674,037

(22) Filed: Feb. 17, 2022

(65) Prior Publication Data

US 2022/0272418 A1 Aug. 25, 2022

(30) Foreign Application Priority Data

Feb. 22, 2021 (TW) .................................. 110106067

(51) Int. Cl.
*H04N 21/472* (2011.01)
*G10L 25/57* (2013.01)
*G10L 13/04* (2013.01)
*G06F 3/16* (2006.01)

(52) U.S. Cl.
CPC ....... *H04N 21/47217* (2013.01); *G06F 3/165* (2013.01); *G10L 13/04* (2013.01); *G10L 25/57* (2013.01)

(58) Field of Classification Search
None
See application file for complete search history.

(56) References Cited

U.S. PATENT DOCUMENTS

2021/0224319 A1* 7/2021 Ingel .................... G06F 16/686

* cited by examiner

*Primary Examiner* — Omar S Parra
(74) *Attorney, Agent, or Firm* — McClure, Qualey & Rodack, LLP

(57) ABSTRACT

An audio mixing method for network streaming includes the steps of establishing a network streaming connection between the first end and the second end, generating a text voiced audio signal based on a trigger signal by the first end, mixing a play signal and the text voiced audio signal into a play signal with the text voiced audio signal, in the state of the network streaming connection, transmitting the play signal with text voiced audio signal to the second end, and the play signal with text voiced audio signal is played by the second end.

20 Claims, 1 Drawing Sheet

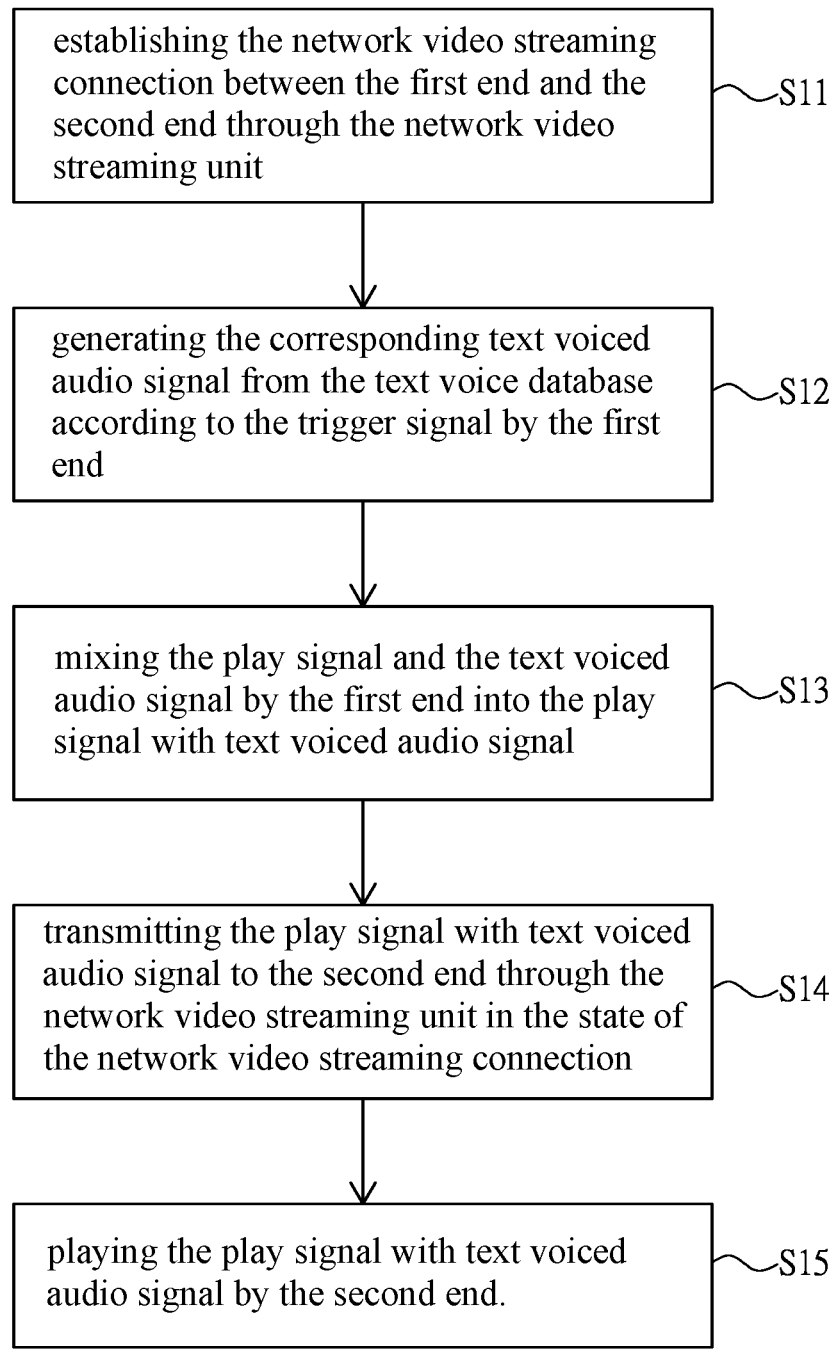

AUDIO MIXING AND SIGNAL TRANSMISSION METHOD FOR NETWORK STREAMING

CROSS REFERENCE TO RELATED APPLICATIONS

This Non-provisional application claims priority under 35 U.S.C. § 119(a) on Patent Application No. 110106067 filed in Republic of China on Feb. 22, 2021, the entire contents of which are hereby incorporated by reference.

BACKGROUND

1. Technical Field

The invention relates to an audio mixing method and a signal transmission method, in particular to an audio mixing method and a signal transmission method of network streaming.

2. Description of Related Art

During network streaming, to instantly mix the voice, it must first use the mixer to pre-record the voice segment, and then use the compatible software to preview and adjust the sound output result and record it. Under certain conditions, the streamer may enable the mixing function to mix in these pre-recorded voices to achieve the purpose of increasing the richness of the live broadcast content. The disadvantage of this method is that the effect of the sound is limited by the audio of the streamer itself, and a lot of tools or software must be used to greatly change the effect of the voice. In addition, it is difficult to manage a large volume of voice recording.

Therefore, it is obvious that the current network streaming still has deficiencies related to the above problems and needs to be improved.

SUMMARY OF THE INVENTION

The invention discloses a signal transmission method for network video streaming, which is applied to a network video streaming unit that communicates with at least one first end and at least one second end, including establishing a network video streaming connection between the first end and the second end through the network video streaming unit; generating a corresponding text voiced audio signal from a text voice database according to a trigger signal by the first end; mixing a play signal and the text voiced audio signal by the first end into a play signal with text voiced audio signal; transmitting the play signal with text voiced audio signal to the second end through the network video streaming unit in the state of the network video streaming connection; and playing the play signal with text voiced audio signal by the second end.

In addition, the invention also discloses a network streaming for an audio mixing method, including establishing a network streaming connection between the first end and the second end; generating a corresponding text voiced audio signal from a text voice database according to a trigger signal by the first end; mixing a play signal and the text voiced audio signal by the first end into a play signal with text voiced audio signal; transmitting the play signal with text voiced audio signal to the second end through the network video streaming unit in the state of the network streaming connection; and playing the play signal with text voiced audio signal by the second end.

Therefore, according to the technical content of the invention, the signal transmission method for the network video streaming and the audio mixing method for the network streaming are provided, which is mixing the play signal and the text voiced audio signal by the first end into the play signal with text voiced audio signal, and transmitting the play signal with text voiced audio signal to the second end through the network video streaming unit in the state of the network streaming connection, which is convenient for users to quickly create a variety of mixed content and enrich the content of network streaming.

The detailed technology and preferred embodiments implemented for the subject invention are described in the following paragraphs accompanying the appended drawings for people skilled in this field to well appreciate the features of the claimed invention.

BRIEF DESCRIPTION OF THE DRAWINGS

The parts in the drawings are not necessarily drawn to scale, the emphasis instead being placed upon clearly illustrating the principles of at least one embodiment. In the drawings, like reference numerals designate corresponding parts throughout the various diagrams, and all the diagrams are schematic.

FIG. 1 is a flowchart showing a signal transmission method and an audio mixing method for the network streaming according to an embodiment of the invention.

DETAILED DESCRIPTION

Reference will now be made to the drawings to describe various inventive embodiments of the present disclosure in detail, wherein like numerals refer to like elements throughout.

The following will clearly illustrate the spirit of the invention with drawings and detailed descriptions. Anyone with ordinary skill in the art who understands the embodiments of the invention can make changes and modifications with the techniques taught in the invention, which does not deviate from the spirits and scope of the invention.

The language used herein is for the purpose of describing embodiments and is not intended to be limiting. The singular forms such as "a", "the", "this" and "these", as used herein, also include the plural forms.

The terms "first", "second", etc. used in the specification do not specifically refer to the order, nor are they used to limit the present invention, but are only used to distinguish elements or operations described in the same technical terms.

As used herein, "coupling" or "connecting" may refer to two or more elements or devices in direct physical contact with each other, or in indirect physical contact with each other, and may also refer to two or more elements or devices with each other operation or action can also refer to the direct or indirect connection between electrical properties (electricity or electrical signals).

The terms "comprising", "including", "having", "containing", etc. used in the specification are all open-ended terms, meaning including but not limited to.

As used herein, "and/or" includes any and all combinations of the stated objects.

Directional terms used herein, such as up, down, left, right, front or back, etc., are only to refer to the directions of the accompanying drawings. Therefore, the directional language used is for illustration and not for limitation of the invention.

Regarding the terms used in the specification, unless otherwise specified, they usually have the ordinary meaning of each term used in this field, in the content and special content of the invention. Certain terms used to describe the invention are discussed below or elsewhere in the specification to provide those skilled in the art with additional guidance in the description of the invention.

The signal transmission method and the audio mixing method for the network streaming in the embodiment may be applied to the video/audio streaming (e.g., video conference or live streaming) method and system. Of course, the signal transmission method and the audio mixing method for the network streaming may also cover the video/audio streaming (e.g., video conference or live streaming) method and system. Alternatively, the signal transmission method and the audio mixing method for the network streaming may themselves be a part of the video/audio streaming (e.g., video conferencing or live streaming) method and system.

In the embodiment, the signal transmission method and the audio mixing method for the network streaming can transmit the information of the first end to the second end through the network streaming. In the embodiment, the first end may be a near end, and the second end may be a remote end, where the near end may refer to a local end of the near end or a cloud of the near end, and the remote end may refer to a local end of the remote end or a cloud of the remote end, there is no limit here.

As shown in FIG. 1, which is a flowchart of the signal transmission method for a network video streaming according to an embodiment of the invention. The signal transmission method is applied to a network video streaming unit communicating with at least one first end and at least one second end and includes steps S11 to S15. Step S11 is to establish a network video streaming connection between the first end and the second end through the network video streaming unit. Step S12 is to generate a corresponding text voiced audio signal from a text voice database according to a trigger signal by the first end. Step S13 is to mix a play signal and the text voiced audio signal by the first end into a play signal with text voiced audio signal. Step S14 is to transmit the play signal with text voiced audio signal to the second end through the network video streaming unit in the state of the network video streaming connection. Step S15 is to play the play signal with text voiced audio signal by the second end.

As mentioned above, according to the technical content of the invention, which is convenient for users to quickly create a variety of mixed content and enrich the content of network streaming by mixing the play signal and the text voiced audio signal by the first end to form the play signal with text voiced audio signal, and transmitting the play signal with text voiced audio signal to the second end through the network video streaming unit in the state of the network streaming connection.

For a detailed example, please refer to FIG. 1, in step S11 of the embodiment, the network video streaming connection is established between the first end and the second end by the network video streaming unit. Among them, when the network video streaming unit is a video conference unit, the network video streaming connection is a network video conference connection, and when the network video streaming unit is a video live streaming unit, the network video streaming is a webcasting connection. For example, under the multi-player connection of the network video streaming, the transmission between the first end and the second end can be a one-way design that can only send information to the second end (e.g., live streaming) from the first end and it can also be a two-way design (e.g., video conference) where the first end and the second end can send information to each other. The number of the first end and the second end can be one each or more than one. Taking live streaming as an example, the first end can be one, and the second end can be multiple.

In step S12 of the embodiment, the first end can generate the corresponding text voiced audio signal from the text voice database according to the trigger signal. Among them, the trigger signal can be determined by the user operating the trigger button or generated according to a specific event analysis. For example, the specific event can be triggered by detecting that the play signal has a specific audio, or the specific event can be triggered when it is detected that the play signal has a specific video picture. In addition, in the embodiment, the text voiced audio signal may refer to a sound signal after converting text into voice.

Step S12 in the embodiment includes step S121 and step S122. Step S121 is to find out a sound information corresponding to a textual information from the text voice database through the first end according to the trigger signal. Step S122 is to generate the text voiced audio signal after passing the sound information through a sound processing process. The text voice database in step S121 may be a database with voices corresponding to text, and the database may be stored in the cloud or the local end. The sound processing process in step S122 can be performed in different ways according to actual requirements, such as adjusting the sound frequency, the volume of the sound, or the voiceprint to achieve the effect that the user wants to present. The above-mentioned sound processing may be preset adjustment or real-time calculation.

In step S13 of the embodiment, the play signal and the text voiced audio signal are mixed by the first end to form the play signal with text voiced audio signal. Among them, the play signal may include an image signal and/or a sound signal, wherein the image signal may be video information or picture information, and certainly may be other multimedia playing information. In addition, the play signal may be generated by a playing source, and the playing source may be an audio-visual source, such as a camera and/or a microphone.

In the embodiment, mixing to form the play signal with text voiced audio signal may refer to mixing the text voiced audio signal and the play signal (e.g., the audio signal in the play signal). In the embodiment, as an example, the first end is to mix the text voiced audio signal and the sound signal of the play signal.

In the embodiment, the signal transmission method of the network video streaming may further include step S16. Step S16 is to transmit the textual information from the first end to the second end when the network video streaming is connected. Among them, the time stamp of the textual information transmitted to the second end corresponds to the time stamp of the text voiced audio signal. In other words, users at the second end can search the textual information in real-time or non-real-time by means of text retrieval (manual or automatic retrieval for keywords) to find the sound signal corresponding to the time stamp, so as to facilitate the use of the network streaming for real-time or non-real-time recording and broadcasting, such as wonderful editing, quick search after recording, or wonderful playback, etc.

In step S14 of the embodiment, in the state of the network video streaming connection, the network video streaming unit of the first end can transmit the play signal with text voiced audio signal to the second end by compressing and converting it into a streaming format, and the play signal with text voiced audio signal is played by a playing module of the second end. In the embodiment, the text voiced audio signal can be played out together with the sound signal of the play signal, and the textual information can be played out together with the video information of the play signal. Wherein, the playing module can be a display and/or a speaker.

In the embodiment, in the signal transmission method and the audio mixing method for the network streaming, the network video streaming unit may be the video conference unit or the live streaming unit, which may be implemented by software or hardware devices. The network video streaming unit may be a third-party software and hardware device, and one third-party video conferencing software is taken as an example here. Among them, the aforementioned steps S11 and S14 may be performed by the network video streaming unit (taking a third-party video conference software as an example). Wherein, step S11 may be performed by the network video streaming unit of the first end or the network video streaming unit of the second end, and step S14 may be performed by the network video streaming unit of the second end. In addition, steps S12, S13 and S15 can be performed by a self-designed software and/or hardware device, wherein at the first end, our device (the self-designed software and/or hardware device) can be connected between the playing source and the network video streaming unit of the first end, and at the second end, our device can be connected between the playing module and the network video streaming unit of the second end.

a network streaming for an audio mixing method, including: establishing a network streaming connection between the first end and the second end; generating a corresponding text voiced audio signal from a text voice database according to a trigger signal by the first end; mixing a play signal and the text voiced audio signal by the first end into a play signal with text voiced audio signal; transmitting the play signal with text voiced audio signal to the second end through the network video streaming unit in the state of the network streaming connection; and playing the play signal with text voiced audio signal by the second end. Among them, the network streaming connection may refer to a network audio streaming connection or a network audio-visual streaming connection.

The embodiment has been described in detail in the above-mentioned FIG. 1 and the corresponding paragraphs, and will not be repeated here.

Even though numerous characteristics and advantages of certain inventive embodiments have been set out in the foregoing description, together with details of the structures and functions of the embodiments, the disclosure is illustrative only. Changes may be made in detail, especially in matters of arrangement of parts, within the principles of the present disclosure to the full extent indicated by the broad general meaning of the terms in which the appended claims are expressed.

What is claimed is:

1. A signal transmission method for network video streaming, which is applied to a network video streaming unit that communicates with at least one first end and at least one second end, comprising:
    establishing a network video streaming connection between the first end and the second end through the network video streaming unit, wherein the network video streaming connection is applied to a video conference or a live streaming;
    generating a corresponding text voiced audio signal from a text voice database according to a trigger signal by the first end, wherein the trigger signal is determined by a user operating a trigger button or generated according to a specific event analysis;
    mixing a play signal and the text voiced audio signal by the first end into a play signal with text voiced audio signal, wherein the play signal and the text voiced audio signal are outputted by a different source;
    transmitting the play signal with text voiced audio signal to the second end through the network video streaming unit in the state of the network video streaming connection; and
    playing the play signal with text voiced audio signal by the second end.

2. The signal transmission method for network video streaming of claim 1, wherein the network video streaming connection is a network video conference connection when the network video streaming unit is a video conference unit, or the network video streaming is a webcasting connection when the network video streaming unit is a video live streaming unit.

3. The signal transmission method for network video streaming of claim 1, wherein the play signal comprises an image signal and/or a sound signal.

4. The signal transmission method for network video streaming of claim 1, wherein step of generating a corresponding text voiced audio signal from a text voice database according to a trigger signal by the first end, comprising:
    finding out a sound information corresponding to a textual information from the text voice database through the first end according to the trigger signal; and
    generating the text voiced audio signal after passing the sound information through a sound processing process.

5. The signal transmission method for network video streaming of claim 4, further comprising:
    transmitting the textual information to the second end from the first end in the state of the network video streaming connection.

6. The signal transmission method for network video streaming of claim 5, further comprising:
    a time stamp of the textual information transmitted to the second end corresponds to a time stamp of the text voiced audio signal.

7. The signal transmission method for network video streaming of claim 6, wherein the user at the second end is searching for the textual information in real-time or non-real-time by text retrieval to find the sound signal corresponding to the time stamp for real-time or non-real-time recording and broadcasting, such as a wonderful editing, a quick search after recording, or a wonderful playback.

8. The signal transmission method for network video streaming of claim 1, wherein the step of mixing the play signal and the text voiced audio signal by the first end into the play signal with text voiced audio signal is achieved by mixing a sound signal of the text voiced audio signal and the play signal through the first end.

9. The signal transmission method for network video streaming of claim 1, further comprising:
    generating the play signal by a playing source.

10. The signal transmission method for network video streaming of claim 1, wherein the specific event is triggered by detecting that the play signal has a specific audio.

11. The signal transmission method for network video streaming of claim 1, wherein the specific event is triggered when it is detected that the play signal has a specific video picture.

12. A network streaming for an audio mixing method, comprising:
    establishing a network streaming connection between the first end and the second end, wherein the network streaming connection is applied to a video conference or a live streaming;
    generating a corresponding text voiced audio signal from a text voice database according to a trigger signal by the first end, wherein the trigger signal is determined by a user operating a trigger button or generated according to a specific event analysis;
    mixing a play signal and the text voiced audio signal by the first end into a play signal with text voiced audio signal, wherein the play signal and the text voiced audio signal are outputted by a different source;
    transmitting the play signal with text voiced audio signal to the second end through the network video streaming unit in the state of the network streaming connection; and
    playing the play signal with text voiced audio signal by the second end.

13. The network streaming for an audio mixing method of claim 12, wherein the network streaming connection is a network audio streaming connection or a network audio-visual streaming connection.

14. The network streaming for an audio mixing method of claim 12, wherein the play signal comprises an image signal and/or a sound signal.

15. The network streaming for an audio mixing method of claim 12, wherein the step of generating a corresponding text voiced audio signal from a text voice database according to a trigger signal by the first end, comprising:
    finding out a sound information corresponding to a textual information from the text voice database through the first end according to the trigger signal; and
    generating the text voiced audio signal after passing the sound information through a sound processing process.

16. The network streaming for an audio mixing method of claim 15, further comprising:
    transmitting the textual information to the second end from the first end in the state of the network streaming connection.

17. The network streaming for an audio mixing method of claim 16, further comprising:
    a time stamp of the textual information transmitted to the second end corresponds to a time stamp of the text voiced audio signal.

18. The network streaming for an audio mixing method of claim 17, wherein the user at the second end is searching for the textual information in real-time or non-real-time by text retrieval to find the sound signal corresponding to the time stamp for real-time or non-real- time recording and broadcasting, such as a wonderful editing, a quick search after recording, or a wonderful playback.

19. The network streaming for an audio mixing method of claim 12, wherein the specific event is triggered by detecting that the play signal has a specific audio.

20. The network streaming for an audio mixing method of claim 12, wherein the specific event is triggered when it is detected that the play signal has a specific video picture.

* * * * *